United States Patent Office 3,489,669
Patented Jan. 13, 1970

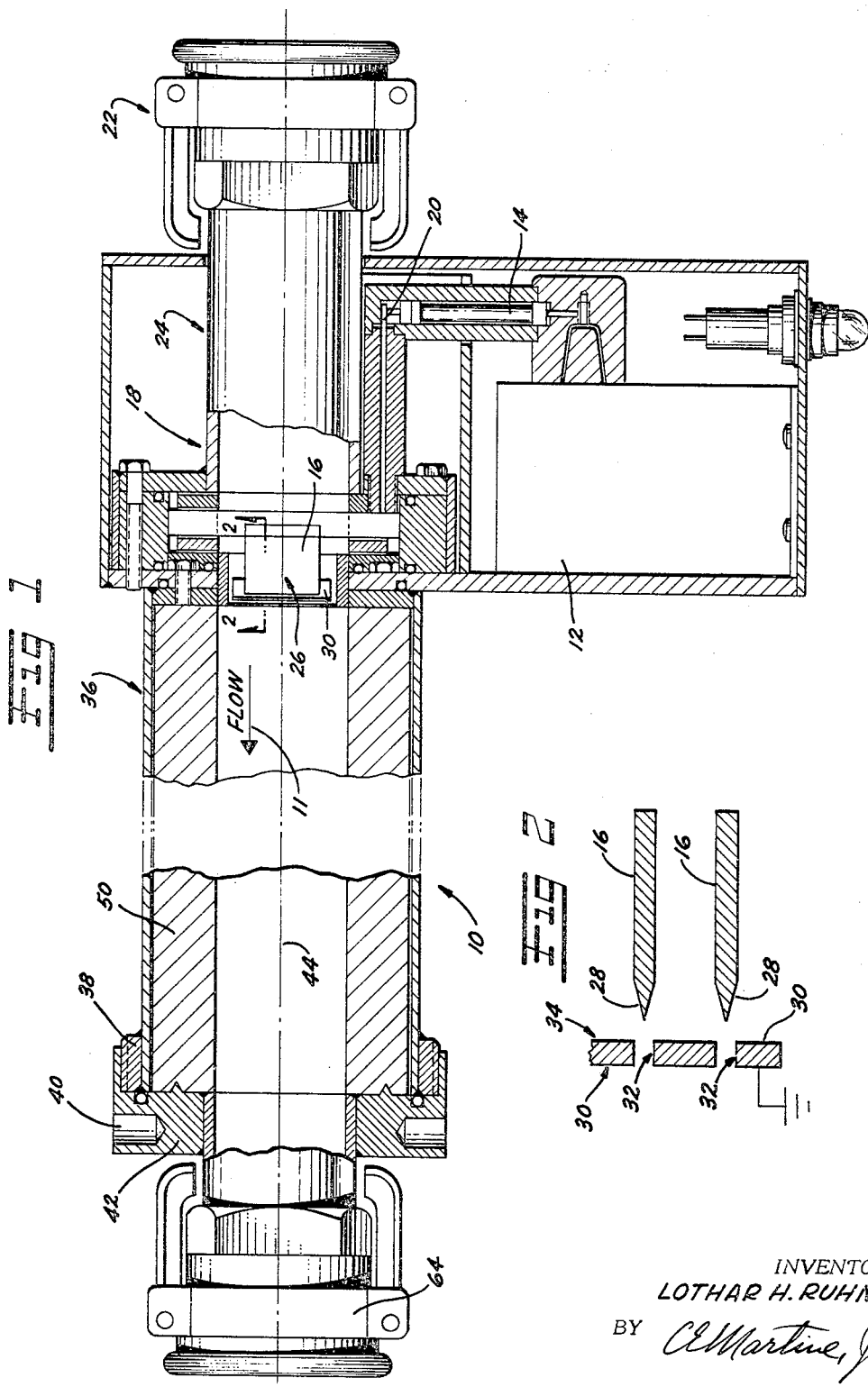

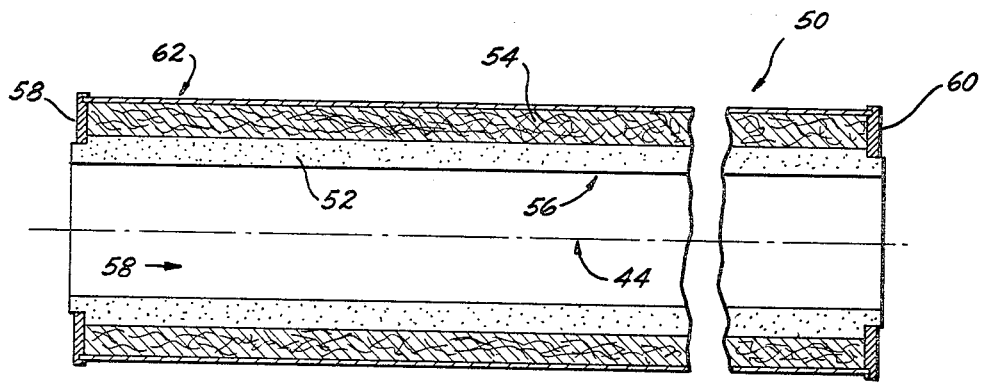
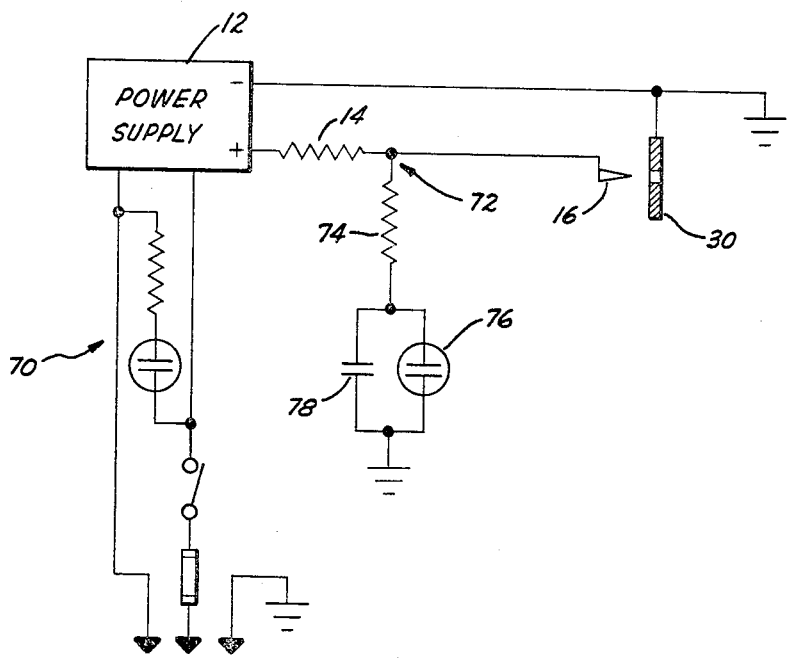

3,489,669
ELECTROHYDRODYNAMIC APPARATUS FOR REMOVING PARTICLES FROM A PARTICLE-LADEN FLUID
Lothar H. Ruhnke, Hilo, Hawaii, assignor to Litton Systems, Inc., Beverly Hills, Calif., a corporation of Maryland
Filed June 30, 1966, Ser. No. 561,828
Int. Cl. B01d 29/08; B01k 1/00
U.S. Cl. 204—302                              8 Claims

ABSTRACT OF THE DISCLOSURE

An electrohydrodynamic device for precipitating particles from a particle-laden fluid including a conduit for defining a flow path for the flow, the conduit having a first portion containing ionizing means for electrically charging the particles to develop a space charge to bias the particles radially outward in the flow path, and an enlarged second portion of the conduit downstream from the ionizing means, the second portion being of an enlarged cross-section to contain a filter having a central fluid passageway of the same general cross-section as the first portion of the conduit, the filter being fabricated at least partially from porous material to entrap the radially directed biased particles.

---

This invention relates to methods of and apparatus for removing particles from a particle-laden fluid and more particularly to an electrohydrodynamic apparatus and method of removing particles from dielectric liquids, such as hydrocarbon fuels, and particle-laden gases, such as automobile engine exhaust gases.

In the past, considerable effort has been expended in providing various ways for removing particulate matter from gases and liquids. For example, special filtering material, such as flossed polyethylene has been developed for removing particles from gases by flowing the gas directly through the mass of the filter. Such filters fabricated from flossed polyethylene are dependent upon the gas electrostatically charging the polyethylene strands so that the suspended particles in the gas are strongly attracted to the polyethylene. However, such filters are designed to be easily washed to remove accumulated dirt by merely directing a stream of water through the flossed polyethylene strands. Accordingly, it is manifest that it is impractical to provide such a mass of flossed polyethylene strands to remove particulate matter from a liquid by flowing the liquid through the polyethylene filter, because the liquid would continuously remove the particles from the strands and no filtering action would occur. Moreover, a substantial pressure drop is created by flowing the liquid through the mass of such filter material.

Other filtering and precipitation methods have been suggested, such as the well-known electrostatic precipitator. However, as is the case with the polyethylene filter, this type of precipitator has not been successfully utilized in precipitating particles from liquids.

Another type of precipitator designed specifically for removing particulate matter from liquids has been referred to as a space-charge field precipitator. In this type of apparatus, an ionizer is provided in the flowpath of a particle-laden liquid to charge the particles and form a space-charge in the liquid. A dielectric conduit is provided down-stream from the ionizer for receiving the liquid. The space-charge creates an electric field tending to move the charged particles radially outward so that they precipitate on the relatively smooth walls of the dielectric conduit. While the space-charge field precipitator was a substantial advance in the art, detailed experiments conducted to maximize the performance of such apparatus revealed certain factors which severely limited the maximum efficiency which could be obtained.

More particularly, in the use of this type of apparatus for liquid flow rates in the range of ten gallons per minute and particle sizes in the range of one micron in diameter, it has been found that in the absence of electrical forces acting on the particles, the particles do not adhere to the walls of the dielectric conduit. Thus, a charged particle reaching the wall of the dielectric conduit will stay there in the presence of strong electric fields and unipolar ion densities. The charge of the particle, besides depending upon the electric field and ion density, depends on the electrical properties of the particle, of the wall and of the liquid film between them. The electric field component perpendicular or transverse to the wall will exert a Coulomb force on the particle to press it to the wall. This force and a friction coefficient determine the drag forces necessary to flush the particle away from the wall and reintroduce it into liquid flow stream. An additional force is exerted by an electrical field component against the direction of the liquid flow. If the resultant force component is strong enough, it will overcome the drag forces and the particle will move against the flow of liquid. Because the electric field decreases with increasing distance from the ionizer, there is a distance $X_1$ downstream from the ionizer below which no collection takes place because of the strong longitudinal fields, and a distance $X_2$ beyond which no collection is possible due to the very low radial-electric fields.

Analysis of the drag on particles at the wall, the friction force at the wall, the additional longitudinal component of the electric field present in the dielectric conduit and from the radial-electric field force, indicate that whenever the drag forces or the longitudinal Coulomb forces exceed the frictional and transverse forces, the particle will move along the wall away from the regions of electric fields until they are swept into the stream of the liquid. Thus, there is a maximum liquid velocity in the dielectric conduit which cannot be exceeded without reducing the precipitation efficiency to zero. Because of the relatively low electric field forces and relatively high drag forces, the range of operation of the precipitator can be fairly narrow.

Another factor which is of considerable importance to the operation of a precipitator is the length of time it takes for the filter to become saturated, i.e., to become incapable of retaining additional particles. It has been found that the saturation time for standard space-charge field precipitators is very short, i.e., on the order of 20 minutes. Clearly, saturation times in the order of days, if not weeks, are essential to achievement of low precipitator maintenance costs.

Other problems attendant the development of precipitators utilizing the space-charge field precipitation method were that the materials selected for the dielectric conduit are very critical to the operation of the precipitator. When the particle-laden liquid was compression ignition engine fuel, for example, and when polyvinyl chloride was used for the dielectric conduit, the fuel dissolved the plasticizer within several hours, resulted in a considerable hardening, shrinking and hazing of the conduit and caused a rapid decrease in the precipitation efficiency. Moreover, attempts to use neoprene rubber for the dielectric conduit resulted in low adherence and low collection efficiency. Atttempts were made to corrugate the inner wall of the dielectric conduit, but this did not result in particle collection.

Research conducted in an endeavor to eliminate such problems as deterioration of dielectric conduit material, low liquid flow rates and low precipitation efficiency, indicate that unusually high efficiency and flow rates can be achieved by combining specially configured filters with modified space-charge precipitation apparatus. Moreover, these specially configured filters are also useful in removing particles from particle-laden gases. In particular, when the space-charge field apparatus is modified to receive a hollow, annular, porous filter having an inside diameter corresponding to the inside diameter of the conduit upstream from the filter, the main flow stream of the particle-laden liquid does not flow through the porous structure of the annular filter. Rather, contrary to previous methods of using filters, the main flow stream of the liquid passes through a hollow passageway in the annular filter. Because of the electric field in the particle-laden liquid flowing through the passageway, the particles are urged outwardly in a generally radial direction and are forced into the filter where they become trapped. Because the main flow stream of the liquid does not pass through the porous structure of the annular filter, the flow rate of the fluid can be increased without removing the particles from the filter. Experiments conducted with this combination of elements indicates that the hollow filter is a critical element of the combination because relatively high mass efficiencies can now be achieved, whereas prior efficiencies were limited even at relatively low flow rates.

One indication of the fact that the annular filter of the present invention is used in a manner contrary to prior use has resulted from the fact that attempts to locate hollow, annular filters having a porous inner wall have been without success because the common method of constructing a hollow, cylindrical filter is to provide a non-porous, inner core to lend mechanical strength and rigidity to the filter. Strength is required in prior art filters because, of course, the full flow of liquid passes through the mass of the filter and exerts substantial forces on the filter.

An object of the present invention is to provide a new and improved precipitator and method of removing particles from a particle-laden fluid.

Another object of this invention resides in a modified space-charge field precipitator in combination with a novel filter cartridge for increasing precipitation efficiency while eliminating the effect of fluid flow velocity on such efficiency.

A further object of the present invention resides in the provision of an annular filter cartridge having a central passageway therein for receiving a particle-laden liquid, wherein an electric field effective in said passageway advances the particles into the filter cartridge.

An additional object of this invention resides in a method of filtering particles from automotive exhaust gases by passing only the particles through the cellular structure of a filter.

With these and other objects in view, the present invention contemplates a high fluid flow rate, high efficiency precipitator including a space-charge field precipitator modified to receive a hollow, annular porous filter in a dielectric conduit of the precipitator. When the fluid is liquid, the liquid is ionized prior to entry into a central passageway in the filter. An electric field established in the liquid urges the particles out of the liquid into the filter. The passageway in the filter confines the liquid to the center of the filter so that the particles are not thereby removed from the filter.

Other objects and a complete description of the present invention will become apparent from the following description and the appended drawings, in which:

FIGURE 1 is an elevational view taken in cross section illustrating an ionizer assembly for ionizing particle-laden liquid flowing into a passageway in a filter cartrdge according to the principles of this invention;

FIGURE 2 is a cross sectional view taken along line 2—2 of FIGURE 1 showing a pointed emitter and an opposed aperture in a plate of the ionizer assembly;

FIGURE 3 is a detailed elevational view taken in cross section showing the filter cartridge illustrated in FIG. 1 having a passageway for guiding the liquid therethrough without passing through the porous, cellular structure of the filter; and FIGURE 4 is a schematic drawing of an electrical power supply and indicating circuit for energizing the precipitator shown in the other drawings.

Referring now to FIGURE 1 of the drawings, there is shown an electrohydrodynamic precipitator 10 for removing particulate material from a liquid flowing in the direction of an arrow 11. The precipitator 10 is shown including a standard high voltage power supply 12 capable of supplying a potential of 8 kv., for example, at a power input of 10 watts, 117 volts AC. In the application of the invention for filtering automotive exhaust gases, the power supply 12 may be the standard automobile high voltage coil. The power supply 12 is fed across a resistor 14, having a resistance of 15 megohms, for example. The resistor 14 protects emitters 16 of an ionizer assembly 18 in case of internal shorting, lowers the voltage of that required for ionization and limits the current to about 150 microamps, for example. A high voltage lead 20 connects the resistor 14 to the ionizer assembly 18.

Considering the application of the present invention for filtering liquids, the ionizer assembly includes a coupling 22 designed to permit a liquid tight connection between a source (not shown) of particle-laden liquid and a dielectric liquid supply tube 24. Mounted at the left end of the tube 24 is an array 26 of the emitters 16 which are connected to the high voltage lead 20. While the required number of emitters 16 varies with the desired flow rate and other known factors, one embodiment of the present invention designed for removing particles at a liquid flow rate of 50 gallons per minute may include fourteen (14) emitters 16 each provided with a pointed tip 28 (FIG. 2) having a length of 28 mm. measured perpendicular to the direction of liquid flow. In the 50 gallons per minute embodiment, for example, the array 26 of emitters 16 is mounted opposite to a grounded plate 30 having fourteen (14) rectangular openings 32. Each opening is about 0.75 mm. in width and 28 mm. long. The tips 28 of the emitters 16 are positioned about 0.75 mm. from the edge 34 of the plate 30 nearest the emitters 16. The high voltage lead 20 provides a potential of about 6 kv. across the emitters 16 and the plate 30. The construction and operating principles of the emitters 16 and the plate 20 are believed to be well known in the art and are discussed, for example. in the Review of Scientific Instruments, vol. 33, pp. 55–56 (1962).

Connected to the left end of the ionizer assembly 18 is a rigid dielectric conduit 36 which may have an outside diameter of 4.25 inches and a length of 32 inches. A threaded member 38 is secured to the outer wall of the conduit 36 at the left end thereof for connection to a screw cap 40 having an annular portion 42 extending toward the axis 44 of the conduit 36. The screw cap 40 retains a filter cartridge 50 in the dielectric conduit 36 and permits easy removal thereof for replacement purposes. The filter cartridge 50 is provided with an outside diameter slightly less than the inside diameter of the tube 36 and an inside diameter of two inches, for example, so that the inside diameter of the cartridge 50 forms a substantially uninterrupted continuation of the liquid flow path formed by the tube 24. The cartridge 50 may be fabricated in one piece having an annular cross section to provide a relatively large particle retaining volume.

A two-piece embodiment of the cartridge 50 is shown in FIG. 3 because this embodiment has been the subject of extensive tests. As shown in detail in FIG. 3, the two-piece embodiment of the filter cartridge 50 includes an inner core 52 and an outer core 54. The inner core 52 is made from modified cellulose material, such as that sold under the trade name "Micro-Klean Fiber Cartridge Filters." Such material, and suitable alternate material, has an interstitial structure which is highly effective to capture and trap particles. Alternatively, such other filter materials as cotton; felt; sintered, porous stainless steel; and porous ceramic may be used to fabricate the cartridge 50, including the inner core 52. The inner core 52 is fabricated to provide an inner surface 56 which is in line with the inner wall of the tube 24 and which forms a passageway 58 for guiding the main flow stream of liquid from the ionizer assembly 18 toward the left end of the tube 36. The material of the inner core 52 is porous to permit particles to pass through the inner surface 56 and through the inner core 52 into the outer core 54, while the main flow stream of the liquid is restricted to a flow path through the passageway 58.

The outer core 54 may be fabricated from glass wool, for example, by winding layers of glass fibres or glass wool around the inner core to provide the filter cartridge 50 with an outside diameter of four inches, for example. Annular brass discs 58 and 60 are mounted on opposite ends of the filter cartridge 50 and are secured by soldering, for example, to opposite ends of a perforated sheet brass, hollow cylinder 62 which maintains centricity and stability of the filter cartridge during handling thereof.

As shown in FIG. 1, at the left end of the screw cap 40, there is provided a quick connect coupling 64 secured to the screw cap 40 to permit coupling of the precipitator 10 to a device (not shown) which utilizes particle-free liquid.

Referring to FIG. 4, there is shown a schematic diagram of an electric circuit 70 for supplying power to the ionizer assembly 18 and for indicating proper operation of the precipitator 10. As described above, the power supply 12 is connected in series with the resistor 14 which is connected to the emitters 16. A low-frequency oscillating circuit 72 is connected between the resistor 14 and the emitters 16 and includes a resistor 74 and a parallel combination of a neon indicating lamp 76 and a capacitor 78 having a capacitance of 1 mfd., for example. With the operating voltage of 6 kv. applied to the emitters 16, the capacitor 78 will draw a small current over the resistor 74 until the capacitor 78 charges up to the firing voltage of the neon lamp 76. The neon lamp 76 then discharges and provides a short flash of light, indicating desired ionization of the fluid. The capacitor 78 then recharges and the neon lamp 76 again flashes. The frequency of oscillation is directly dependent upon the voltage applied to the emitters 16, which in turn depends upon the current drawn by the emitters 16, and provides an indication of the rate of removal of particles from the particle-laden liquid. The ionized liquid charges the particles. In the ionizer assembly 18, the charged particles and the ionized liquid form a space charge which is flushed into the passageway 58 of the filter cartridge 50. The space charge establishes an electric field in the passageway 58 which is substantially perpendicular to the direction of liquid flow (indicated by arrow 11 in FIG. 1) through the passageway 58 parallel to the axis 44 of the filter cartridge 50. The inner surface 56 of the inner core 52 of the cartridge 50 maintains the main flow stream of the liquid in the passageway 58 in a flow path parallel to the axis 44 so that the liquid flow path is restricted and does not tend to flow through the cellular structure of the inner core 52. As the electric field continues to act on the particles, the particles are advanced into the outer core 54 where they become trapped in the interstitial structure thereof against re-entry into the liquid flow stream in the passageway 58. The liquid, which may have been cloudy or dark colored by the particles prior to entry into the precipitator 10, emerges from the left end of the passageway 58 of the precipitator 10 as a clear liquid which is substantially free from particles. Because the precipitation operation of the precipitator 10 is not dependent upon the flow of liquid through the cellular structure of the filter cartridge 50, there is no increase in the pressure drop across the cartridge 50 as the cartridge becomes increasingly contaminated with particles.

During satisfactory operation of the precipitator 10, the neon lamp 76 will flicker at a substantially steady rate, indicating that the ionizer assembly 18 is drawing the desired current for ionizing the liquid. If the liquid is not being ionized, the ionizer assembly 18 will not draw as much current, hence the oscillator circuit 72 will cease to oscillate and the neon lamp 76 will remain on, indicating a failure of the precipitator 10 to remove the particles from the particle-laden liquid.

Experiments were conducted according to the principles of the present invention with various embodiments of the precipitator 10 using the filter cartridge 50 and a liquid, such as compression ignition engine fuel, pumped through the precipitator 10 at a rate of 10 gallons per minute at a maximum pressure of 15 p.s.i. In these experiments, both the inner core 52 and the outer core 54 were fabricated from cellulose. The fuel was filtered by a standard mechanical filter to remove foreign matter and particles larger than 200 microns. The emitters 16 of the ionizer assembly 18 had a length perpendicular to the fuel flow direction of 20 mm. and four emitters 16 were used. By selecting ionizing voltages from a 0–20 kv. power supply 12, a maximum space charge density of 0.08 amp/m.$^3$ was obtained in the passageway 58 of the cartridge 50 under all flow rates. With the described experimental arrangement, the pressure drop across the precipitator 10 was 2 p.s.i. at 250 cm.$^3$/sec., 4 p.s.i. at 400 cm.$^3$/sec., 6 p.s.i. at 500 cm.$^3$/sec., and 8 p.s.i. at 575 cm.$^3$/sec., which indicates that very low pressure drops occur across the precipitator 10.

To compare the operation of prior space-charge field precipitators which attempt to retain precipitated particles on a relatively smooth wall of a dielectric conduit, apparatus similar to that shown in U.S. Patent 3,129,157 was operated under the following conditions:

| | |
|---|---|
| Liquid | CIE fuel |
| Liquid flow rate ml./sec. | 30 |
| Precipitator length cm. | 18 |
| Precipitator diameter cm. | 2.3 |
| Ionization voltage kv. | 7.5 |
| Concentration of contamination particles/ml. | $7 \times 10^5$ |

After operation of the precipitator for 4 seconds, the efficiency of precipitating particles based on numbers of particles precipitated in one pass through the precipitator 10 was around 94 percent, but after one minute it decreased substantially and did not rise about 50%. The precipitator became saturated, that is, would not remove any more particles from the liquid, when about $3 \times 10^6$ particles were deposited on each square centimeter of the inner wall surface of the dielectric conduit. With a flow rate of 50 gallons per minute, saturation would occur within 20 minutes.

On the other hand, experiments conducted using the precipitator 10 with the 10 g.p.m. flow rate and the cellulose filter cartridge 50 within the dielectric conduit 36, indicated that after continuous filtering for a 20 minute period, there was no evidence of a saturation effect. Moreover, efficiencies up to 85% were attained where the efficiency was based upon the number of particles filtered. When the mass of the remaining particles is considered in evaluating efficiency, the particle number efficiency of 85 percent is equal to a mass efficiency of about 99 percent.

Further, by recycling a sample of CIE fuel through the precipitator for one hour at the rate of 10 gallons per minute, the particle count was reduced from $6.25 \times 10^7$ particles per ml. to $8 \times 10^4$ particles per ml., with the remaining particles being of about 1 micron in diameter, which was the size limit of the apparatus.

While the specific embodiment of the precipitator 10 described in detail above has been designed for removing particles from fluids, such as liquids, the principles of the invention may be used with success to remove particles from particle-laden fluids, such as automobile exhaust. In this arrangement, the high voltage coil of an automobile is connected to the ionizer assembly 18. Also, the dielectric conduit 36 forms at least a portion of the automobile exhaust conveying system, such as the exhaust muffler or exhaust pipe of the automobile. In this manner the precipitator 10 will operate so that the particles in the exhaust will be urged radially outward in the dielectric conduit and will enter the cartridge 50. Because of the high particle capacity of the cartridge 50 and the quick connect coupling 64, the cartridge 50 needs changing infrequently, such as at normal servicing of the automobile. Further, because the main flow stream of the gas flows directly through the passageway 58, there is no substantial exhaust back pressure caused during the filtering operation.

It is to be understood that the above-described arrangements are simply illustrative of an application of the principles of the invention. Numerous other arrangements may be devised by those skilled in the art which will embody the principles of the invention and will fall within the spirit and scope thereof.

What is claimed is:

1. An electrohydrodynamic device for precipitating particles from a particle-laden fluid, which comprises:
   conduit means for defining a flow path for said particle-laden fluid;
   ionizing means in a first portion of said conduit means for electrically charging the particles to develop a space charge in said particle-laden fluid, said space charge being effective to bias the particles radially outward in said flow path; and
   filter means received in an enlarged portion of said conduit means downstream from said ionizing means, said filter means having a central fluid passageway of the same general cross-section as said first portion of said conduit means, said filter means having particle retaining interstices surrounding said passageway wherein particles in said particle-laden fluid flowing through said passageway will be urged by said bias into said interstices for retention therein.

2. An electrohydrodynamic device in accordance with claim 1 wherein said filter means is fabricated from electrically insulating, porous material, the porosity of said material rendering said passageway effective to permit the particles to enter said interstices of said filter means in a generally radial direction in response to said space charge, said porous material precluding re-entry of the particles into said flow path.

3. An electrohydrodynamic device according to claim 1, wherein:
   said filter means includes a tubular member having a generally annular shaped portion and an inner surface defining said passageway for said particle-laden fluid, said tubular member being fabricated from porous material adapted to permit the biased particles to pass radially outward through said inner surface and enter said portion, said portion of said member being effective to retain the particles and to preclude re-entry thereof into said flow path.

4. An electrohydrodynamic precipitator in accordance with claim 3 wherein said inner surface of said tubular member substantially restricts said fluid flowing in said passageway from flowing into the porous material thereof, said porous material having interstices for receiving particles biased from said fluid by said space charge so that the particles are precluded from re-entering said fluid in said passageway.

5. A precipitator according to claim 4 wherein said fluid is a dielectric liquid and said first portion of said conduit means and said passageway form a substantially uninterrupted continuation of the liquid flow path defined by said conduit means.

6. A precipitator according to claim 1 wherein:
   said filter means includes a hollow, annular filter cartridge having an inner layer fabricated from modified cellulose material and an outer layer fabricated from glass fibres, an annular disc mounted at each end of said cartridge, and a cylindrical member surrounding said filter cartridge and secured to each of said annular discs.

7. A precipitator in accordance with claim 1, wherein the particle-laden fluid is the exhaust gas from an internal combustion engine, and said ionizing means is connected to an eelctrical power supply, and said conduit means forms at least a portion of a system for conveying exhaust from said engine.

8. An electrohydrodynamic device for precipitating particles from a particle-laden dielectric liquid wherein the rate of movement of the particles is proportional to the degree of the ionization of the liquid, which comprises:
   conduit means for defining a flow path for said dielectric liquid;
   ionizing means including electrode means received in said conduit means for applying an electric potential to said liquid to ionize said liquid and charge the particles to bias the particles radially outward in said flow path;
   resistor means in series with said electrode means for developing a voltage proportional to the degree of ionization of said liquid;
   oscillator means connected to said resistor means;
   filter means received in said conduit means downstream from said ionizing means for defining a central liquid passageway and having particle-retaining interstices surrounding said passageway wherein particles in said liquid flowing through said passageway will be urged by said bias into said interstices for retention therein; and
   means responsive to said operating frequency for indicating the rate of removal of the particles from said liquid.

References Cited

UNITED STATES PATENTS

| | | | |
|---|---|---|---|
| 2,573,967 | 11/1951 | Hamlin | 204—302 |
| 3,129,157 | 4/1964 | Loeckenhoff | 204—299 |
| 3,190,827 | 6/1965 | Kok et al. | 204—302 |
| 3,252,885 | 5/1966 | Griswold | 204—302 |

JOHN H. MACK, Primary Examiner

E. ZAGARELLA, Jr., Assistant Examiner

U.S. Cl. X.R.

204—184, 186, 299